United States Patent Office 3,682,584
Patented Aug. 8, 1972

3,682,584
PAD DYEING POLYESTER TEXTILE WITH POLY-ACRYLIC ACID HYDROXYALKYL ESTER AND ALKOXYLATED MANNICH COMPOUND OR ALKOXYLATED SULFONATED FATTY AMINE
Gunther Boehmke, Leverkusen-Grossendriesch, Walter Hees, Cologne-Hohenberg, and Mathieu Quaedvlieg, Opladen, Germany, assignors to Farbenfabriken Bayer Aktiengesellschaft, Leverkusen, Germany
No Drawing. Filed Jan. 27, 1969, Ser. No. 794,420
Claims priority, application Germany, Feb. 2, 1968,
P 19 01 411.0
Int. Cl. D06p 5/06
U.S. Cl. 8—172                                         4 Claims

ABSTRACT OF THE DISCLOSURE

An improvement in the process of dyeing polyester materials by padding is obtained by using padding liquors containing an auxiliary comprising (a) polyacrylic acid alkylene glycol ester, e.g. hydroxyethyl ester of polyacrylic acid; and
(b) alkoxylation products of Mannich compounds produced from phenols, formaldehyde and amines ($b_1$) or 1–2 —$SO_3M$— group containing alkoxylation products of fatty amines ($b_2$) wherein M is hydrogen, ammonium alkali metal or alkaline earth metal.

---

The invention relates to a process for continuous dyeing polyester textile materials according to the thermosol process with padding liquors containing disperse dyestuffs; more particularly it concerns a process wherein the dyeing is carried out with padding liquors which contain in addition to the dyestuffs (a) polyacrylic acid alkylene glycol esters and
(b) alkoxylation products of Mannich compounds produced from phenols, formaldehyde and amines ($b_1$) or 1–2 —$SO_3M$-groups containing alkoxylation products of fatty amines ($b_2$) whereby M means hydrogen, an alkali metal atom or an alkaline earth metal atom or an ammonium group.

The term polyacrylic acid alkylene glycol esters comprises in particular the hydroxyethyl and hydroxypropyl esters of polyacrylic acid and polymethacrylic acid. These esters may be present, for example, in the form of aqueous solutions. Solutions of this kind can be obtained, for example, by reacting at an elevated temperature approximately 10% aqueous solutions of polymeric acrylic or methacrylic acids, the viscostiy of which amounts to about 1000 to 1500 cp. at 20° C., with a sufficient amount of ethylene oxide or propylene oxide that the pH value of the resultant aqueous ester solutions amounts to 4–7. The viscosity of these ester solutions amounts to about 1500 to 2500 cp. at 20° C.

The term alkoxylation products of the Mannich compounds obtained from phenols, formaldehyde and amines particularly comprises those alkoxylation products which are prepared by reacting the Mannich compounds described below in greater detail, with alkylene oxides, preferably ethylene oxide and propylene oxide, in such a molar ratio that 12 to 80 mols alkylene oxide are apportioned to each phenol molecule and the amount of propylene oxide in the total amount of alkylene oxide used should expediently be 0 to 30%. The 1% aqueous solutions of the alkoxylation products thus obtained generally exhibit a turbidity point above 100° C.

The Mannich compounds on which the alkoxylation products are based can be obtained by condensing phenols, formaldehyde and alkylamines or alkylene-diamines, the molar proportions of the components advantageously being 1:1–2:1–2 respectively 0.5–1, preferably 1:1–2:1–2:1 respectively 0.5.

Examples of phenols are the following: phenol, alkylphenols, such as cresol, butylphenol, isononylphenol and halophenols, such as chlorophenol and dichlorophenol.

Amines are, for example, monoalkylamines, such as methyl-, ethyl-, propyl-, lauryl-, coconut fatty amine, hexadecyl- and octadecyl-amine; dialkylamines, such as dimethyl-, butyl- and metyl-hexadecyl-amine; cycloalkylamines, such as cyclohexyl-amine; and aralkylamines, such as benzyl- and methylbenzyl-amine; furthermore alkylenediamines, such as ethylene-diamine and hexamethylene-diamine.

The term 1–2 —$SO_3M$-groups containing alkoxylation products of fatty amines comprises compounds of the formula

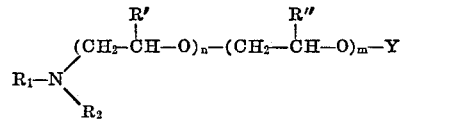
                                                            I wherein $R_1$ denotes a $C_{10}$–$C_{22}$-alkyl or a $C_{10}$–$C_{22}$-alkylene radical,
$R'$ and $R''$ stand independently of one another for hydrogen or a methyl group,
the sum of $n+m$ is a number from 4–100, preferably a number from 20–60,
Y denotes hydrogen or a —$SO_3M$-group, wherein M has the meaning given above,
$R_2$ denotes a $C_1$–$C_4$-alkyl radical, the grouping

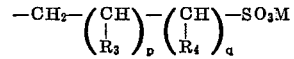

wherein $R_3$ and $R_4$ stand independently from one another for hydrogen or a hydroxy group, the sum of $p+q$ is a number from 1–3 and M has the meaning given above, or the grouping

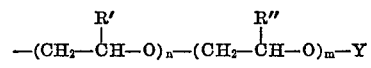

with the proviso that the molecule of the alkoxylated amine respectively of the corresponding ammonium compound contains 1–2 —$SO_3M$-groups.

The quaternisation products of the alkoxylation products of Formula I of fatty amines can be obtained by known manner by reacting compounds of Formula I with usual quaternisation agents, such as alkyl halides, e.g. methyl iodide, isopropyl bromide, chloroacetamide, 2-chloroethanol, 2-chloroethane sulfonic acid, 2-bromoethane sulfonic acid, 3-chloro-2-hydroxy-propane sulfonic acid and benzyl chloride, or dialkyl sulfuric acid esters, e.g. dimethyl sulfate.

To be of especial advantage have proved the 1–2 —$SO_3M$-groups containing alkoxylation products of fatty amines which correspond to the formula

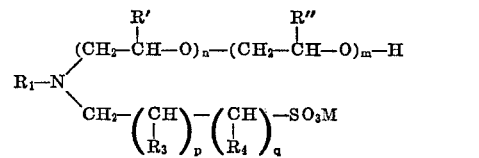
                                                            II or their quaternisation products of the formula

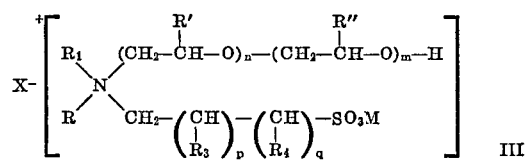
                                                            III wherein $R_1$, $R'$, $R''$, $n$, $m$ $R_3$, $R_4$, $p$, $q$ and M have the meaning stated above, R denotes a $C_1$–$C_8$-alkyl radical optionally substituted by a hydroxy or a carbonamido group, a benzyl radical or the grouping

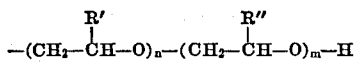

and $X^-$ is an anion.

For $R_1$ should be mentioned as $C_{10}$–$C_{22}$-alkyl radicals for example the dodecyl, tetradecyl, hexadecyl, octadecyl and the docosyl radical; as $C_{10}$–$C_{22}$-alkylene radicals for example the tetradecenyl, hexadecenyl and the octadecenyl radical.

For M should be mentioned as alkali metal atoms especially the sodium and the potassium atom; as alkaline earth metal atoms the magnesium and the calcium atom; as ammonium group the ammonium group or the ammonium groups deriving from mono- di- or triethanol amine.

For R should be mentioned as $C_1$–$C_8$-alkyl radicals optionally substituted by a hydroxy or a carbonamide group, for example the methyl, ethyl, i-propyl, sec.-butyl radical, the carbonamide methyl, 2-hydroxy-ethyl and the 1-hydroxy-propyl-(2)-group.

Examples for the anion $X^-$ are especially the halide ions, such as the chloride, bromide or iodide ion, the anions of acid alkyl sulfuric acid esters, such as the methyl sulfate and the ethyl sulfate ion, and furthermore the toluene sulfonic acid ion.

Examples of the 1–2 —$SO_3M$-groups containing alkoxylation products of fatty amines to be used in the process according to the invention are the compounds of Formula I respectively their quaternisation products in which $R_1$, $R_2$, $R'$, $R''$, $n$, $m$ and Y have the following meaning:

The polyester textile materials to be dyed by the process according to the invention can be based on a great variety of polyesters, e.g. polyethylene terephthalate, polycyclohexane - dimethylene terephthalate, heterogeneous polyesters obtained from terephthalic acid, isoterephthalic acid and ethylene glycol, or sulpho-isophthalic acid and ethylene glycol, furthermore copolyether esters obtained from p-hydroxybenzoic acid, terephthalic acid and ethylene glycol, as well as polycarbonates. These polyester textile materials may also contain other fibre materials, e.g. natural or regenerated cellulose, such as cotton, spun rayon or linen.

The disperse dyestuffs used in the dyeing process according to the invention are the disperse dyestuffs customarily used for dyeing polyester materials, for example, those mentioned in Colour Index, volume 1, pages 1655–1742, 2nd edition (1956).

The quantity in which the polyacrylic acid alkylene glycol esters (a) and alkoxylation products (b) to be used according to the invention are added to the padding liquors may vary within wide limits; it has proved to be especially advantageous when the total quantity of the two components (a) and (b) amounts to 10–40 g. per litre padding liquor.

The proportion between the two components (a) and (b) may also vary within wide limits, but polyacrylic acid alkylene glycol esters (a) and alkoxylation products (b) are preferably used in a proportion by weight of 1:1–10.

With the aid of the process according to the invention it is possible to dye textile materials of polyesters fibres or mixed fibres containing polyester fibres, such as woven and knitted fabrics, in a rapid and extraordinarily uniform manner. When dyeing polyester/cellulose mixed fabrics an excellent resist of the cellulose fibres is achieved. It is therefore possible, after dyeing the polyester portion, to re-dye the accompanying cellulose fibre, without special intermediate cleaning, with the dyestuffs customarily used

| $R_1$ | $R_2$ | $R'$ | $R''$ | $n$ | $m$ | Y | Quaternised with |
|---|---|---|---|---|---|---|---|
| $C_{18}H_{37}$ | —$(CH_2$—$CH_2$—$O)_{17}$—H | H | | 17 | 0 | —$SO_3H$ | |
| $C_{18}H_{37}$ | —$CH_2$—$CH_2$—$SO_3Na$ | H | | 30 | 0 | H | |
| $C_{18}H_{37}$ | —$CH_2$—$CH_2$—$SO_3Na$ | H | | 60 | 0 | H | |
| $C_{18}H_{37}$ | —$CH_2$—$CH_2$—$SO_3Na$ | H | | 30 | 0 | H | Cl—$CH_2$—$CH_2OH$ |
| $C_{18}H_{37}$ | —$(CH_2$—$CH_2$—$O)_{15}$—H | H | | 15 | 0 | H | Cl—$CH_2$—CH—$CH_2$—$SO_3Na$<br>　　　　　OH |
| $C_{12-18}H_{25-35}$ | —$(CH_2$—$CH_2$—$O)_{20}$—$(CH_2$—CH—$CH_2$—$O)_{10}$—H<br>　　　　　　　　　　　　　$CH_3$ | H | —$CH_3$ | 20 | 10 | H | Cl—$CH_2$—CH—$CH_2$—$SO_3Na$<br>　　　　　OH |
| $C_{18}H_{37}$ | —$CH_3$ | H | | 35 | 0 | H | Br—$CH_2$—$CH_2$—$SO_3Na$ |
| $C_{18}H_{35}$ | —$CH_2$—$CH_2$—$SO_3Na$ | H | | 30 | 0 | H | Cl—CH—$CONH_2$ |

The 1–2 —$SO_3M$-groups containing alkoxylation products of Formula I of fatty amines respectively their quaternisation products can be obtained by different known reactions, for instance by sulfonating ethoxylated fatty amines with chlorosulfonic acid, sulfuric acid or amido sulfonic acid whereby 1–2 mols sulfonating agent are apportioned to each mol of ethoxylated fatty amine, and the sulfonated product is optionally subsequently quaternised. Furthermore alkoxylated N-alkyl-aminoethane sulfonic acids are prepared for example by reacting fatty amines with the sodium salt of 2-hydroxyethane sulfonic acid at 250° C. and alkoxylating in known manner the reaction products obtained with alkylene oxides, such product obtained can subsequently be quaternised by known methods with the quaternisation agents mentioned above. A preferred process for the preparation of the quaternisation products consists in reacting fatty amines or N-alkyl fatty amines with alkylene oxides and subsequently quaternising the alkoxylation products obtained with the salts of halogenoalkane sulfonic acids, e.g. with the sodium salt of chloroethane sulfonic acid, of bromoethane sulfonic acid or of the 1-chloro-2-hydroxy-propane sulfonic acid.

for the dyeing of cellulose. Also with the one-bath dyeing of polyester/cellulose woven and knitted mixed fabrics according to the thermosol/heat setting process are obtained outstandingly uniform dyeings by using the polyacrylic acid alkylene glycol esters (a) and the alkoxylation products (b).

EXAMPLE 1

A fabric of polyethylene terephthalate spun fibres is padded on the foulard with a liquor heated to 30° C. and containing per litre 0.072 g. of the dyestuff (I),
1.05 g. of the dyestuff (II),
2 g. of the dyestuff (III),
7.5 g. of the component A1 described below, and
4 g. of the component B1 described below.

The fabric is squeezed off until a weight increase of 50% is achieved, subsequently dried and then treated for 60 seconds in a hot air atmosphere at 200° C. An outstandingly uniform grey dyeing is obtained.

A grey dyeing of the same uniformity was obtained when, instead of 7.5 g. of the component A1, the same amount of the component A2 was used.

The component A1 used was obtained in the following manner:

Ethylene oxide is introduced at 70—80° C, while stirring vigorously, into 500 g. of a 10% aqueous solution of polyacrylic acid with a viscosity of about 1300 cp. until a pH value of 5—6 is obtained. For this purpose about 60 g. ethylene oxide were required. The resultant solution of polyacrylic acid clycol ester had a viscosity of 1600 cp. at 20° C.

The component A2 used was obtained in the following manner:

After the addition of 0.2 g. potassium hydroxide, sufficient propylene-oxide was added dropwise at 70–80° C. to 500 g. of a 10% aqueous solution of polyacrylic acid with a viscosity of about 1300 cp. at 20° C. until the solution had acquired a pH value of 5–6. Approximately 90–100 g. propylene-oxide are required for this purpose. The resultant solution of the polyacrylic acid hydroxypropyl ester had a viscosity of about 1300 cp at 20° C. manner:

The component B1 used was obtained in the following 50 g. of an anhydrous propoxylation product obtained by condensing at 70–80° C. 54 g. cresol, 100 g. of a 30% formaldehyde solution and 47 g. of a 33% methylamine solution and reacting the resultant Mannich condensation product, after separating the supernatant aqueous solutio, with 35 g. propylene-oxide and subsequently drying the reaction product obtained by distilling off the residual water, were reacted at 110–120° C., after the addition of 0.5 g. potassium hydroxide, with 450 g. ethylene-oxide. The resultant alkoxylation product dissolved in water to give a clear solution. The 1% aqueous solution exhibits no turbidity point below 100%.

EXAMPLE 2

A poplin fabric produced from a mixed yarn consisting of 67 parts by weight of a polyethylene terephthalate spun fibre and 33 parts by weight cotton, is padded on the foulard with a liquor heated to 40° C. and containing per litre 7.2 g. of the dyestuff I,
9.6 g. of the dyestuff II,
9.6 g. of the dyestuff III,
11 g. of the component A1 described in Example 1, and
6 g. of the component B2 described below.

The fabric is squeezed off until a weight increase of about 50% is achieved, continuously dried and subsequently treated for 60 seconds in a hot air atmosphere at 200° C. A brown dyeing of an outstanding uniformity is obtained of the polyester fibre portions in the mixed fabric with an optimum reserve of the cotton.

The cotton portion of the fabric can then be re-dyed with vat dyestuffs according to conventional methods of operation, without any special intermediate cleaning, to give the same brown shade.

A similar good dyeing was achieved by using, instead of 6 g. the component B2, the same amount of one of the components B3 or B5 described below.

The component B2 used was obtained in the following manner:

50 g. of an anhydrous Mannich condensation product which was obtained by condensing 73 g. iso-nonylphenol, 10 g. paraformaldehyde and 33 g. cyclohexylamine, were reacted at 120° C., after the addition of 0.25 g. potassium hydroxide, with 210 g. ethylene oxide.

The component B3 used was obtained in the following manner:

50 g. of an anhydrous Mannich condensation product which was prepared by condensing 31 g. phenol, 10 g. paraformaldehyde and 30 g. hexadecylamine at 80–100° C. were reacted at 120° C., after the addition of 0.5 g. potassium hydroxide, with 220 g. ethylene oxide. The resultant ethoxylation product dissolved in water to give a clear solution. The 1% aqueous solution has no turbidity point.

The component B5 used was obtained in the following manner:

150 g. of the sodium salt of stearylamino-ethane sulfonic acid were reacted at 140–150° C. in the presence of 1 g. potassium hydroxide with 500 g. ethylene oxide.

EXAMPLE 3

A dress fabric produced from a mixed yarn consisting of 60 parts by weight of a polyethylene terephthalate spun fibre and 40 parts by weight of a viscose staple fibre is treated on the foulard with a liquor heated to 50° C. and containing per litre.

0.4 g. of the dyestuff I,
6.75 g. of the dyestuff IV,
10 g. of the component A1 described in Example 1, and
5 g. of the component B1 described in Example 1.

The fabric is squeezed out until the increase in weight is 60%, continuously dried and subsequently treated for 60 seconds in a hot atmosphere at 200° C. An outstanding uniform red dyeing of the polyester fibre portion in the mixed fabric is obtained with the largest possible reserve of the spun rayon.

The spun rayon portion can be re-dyed with substantive dyestuffs by conventional methods, without an intermediate drying, yielding the same red shade.

A similar good dyeing was achieved by using, instead of the component B1, 5 g. of one of the components B6 or B7 described below.

The component B6 used was obtained in the following manner:

100 g. of the ethoxylation product obtained from 100 g. methylstearylamine and 450 g. ethylene oxide were dissolved in 100 g. water and 100 g. iso-propanol. This solution was heated with 40 g. of a 30% aqueous solution of the sodium salt of 3-chloro-2 - hydroxy-propane sulfonic acid for 6 hours at 90° C.

The component B7 used was obtained in the following manner:

590 g. of the ethoxylation product prepared from 90 g. stearylamine and 500 g. ethylene oxide were heated with 46 g. amidosulfonic acid for 1 hour at 90° C. and subsequently for 2 hours at 100–105° C.

EXAMPLE 4

A polyester fibre-cotton 67/33-mixed fabric is impregnated at room temperature on the foulard with a liquor which contains per litre 2.1 g. of the dyestuff II,
8.8 g. of the dyestuff IV,
8.8 g. of the dyestuff V,
15 g. of the dyestuff VI,
60 g. urea,
10 g. sodium bicarbonate,
11 g. of the component A1 described in Example 1, and
6 g. of the component B1 described in Example 1.

The fabric is squeezed out until the increase in weight is 50%, continuously dried and subsequently treated for 60 seconds in a hot air atmosphere at 200° C. An outstandingly uniform red dyeing is obtained.

A dyeing of the same uniformity was obtained when, instead of 6 g. of the component B1, 8 g. of one of the components B4 or B8 described below were used.

The component B4 used was obtained in the following manner:

50 g. of a highly viscous Mannich condensation product which was prepared by condensing 73 g. iso-nonylphenol, 20 g. paraformaldehyde and 20 g. hexamethylene-diamine, were reacted, after the addition of 0.7 g. potassium hydroxide, with 360 g. ethylene oxide. The resultant ethoxylation product dissolved in water giving a clear solution.

The component B8 used was obtained in the following manner:

100 g. of component B5 described in Example 2 were quaternised with 9.3 g. 2-chloroethanol by heating for four hours at 110–120° C.

wherein
$R_1$ is a $C_{10}$–$C_{22}$-alkyl or $C_{10}$–$C_{22}$-alkylene radical;
R' and R'' independently of one another are hydrogen or methyl;
$R_3$ and $R_4$ independently of one another are hydrogen or hydroxy;

SURVEY OF THE DYESTUFFS USED IN THE EXAMPLES

| Dyestuff | Constitution | |
|---|---|---|
| I | $O_2N$—⌬—N=N—⌬(OH)—N(CH₃)—C=O | C.I. 12790. |
| II | $O_2N$—⌬—⌬(Cl)—N=N—⌬—N(CH₂CH₂CN)(CH₂CH₂—COOC₂H₅) | (¹). |
| III | anthraquinone with NH₂, O, OH, Br, OH, O, NH₂ | British Patent 787,379. |
| IV | $O_2N$—⌬—⌬(Cl)—N=N—⌬—N(CH₂CH₂CN)(CH₂CH₂—COOC₂H₅) | (¹). |
| V | naphthalene(SO₃H, HO₃S, SO₃H)—N=N—⌬(CH₃)—NH—pyrimidine(SO₂CH₃, CH₃) | |
| VI | naphthalene(SO₃H, HO₃S, OH, SO₃H)—N=N—⌬ with NH—pyrimidine(SO₂CH₃, CH₃) | British Patent 1,120,761, Example 18. |

¹ Mode of synthesis of this dye is obvious from using the coupling components of German Auslegeschrift 1065112 or U.S. Patent 3,097,198 with the coupling component of Claim 5 of U.S. Patent No. 3,125,402.

Certain of the dyestuffs used in the examples and defined above are found in:
British Pat. 787,379
British Pat. 1,120,761
Colour Index, vol. 3, 2nd Edition (No. 12790).

We claim:
1. In the process for continous dyeing of polyester textile materials with padding liquors containing disperse dyestuffs, the improvement comprising padding with a disperse dye liquor containing an auxiliary comprising
   (a) a hydroxyethyl or hydroxypropyl ester of polyacrylic or polymethacrylic acid; and
   (b)(1) alkoxylation products of Mannich compounds containing 12–80 moles of condensed ethylene or propylene oxide per mole of phenol, said Mannich compounds comprising the condensation product of 1 mole of phenol with 1–2 moles of formaldehyde and 1–2 moles of an alkylamine, or 0.5–1 mole of an alkylene diamine; or
   (c) (2) alkoxylation products of fatty amines having the formula

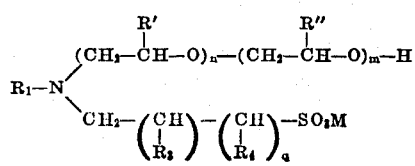

the sum $n+m$ is a number from 4–100;
the sum $p+q$ is a number from 1–3; and
M is hydrogen, an alkali metal atom, an alkaline earth metal atom or an ammonium group;
or their quaternization products of the formula

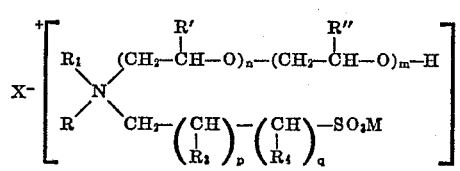

wherein $R_1$, R', R'', $n$, $m$, $R_3$, $R_4$, $p$, $q$, and M have the meaning stated above and R is an alkyl of 1 to 8 carbon atoms, alkyl of 1 to 8 carbon atoms substituted by a hydroxy or a carbonamido group, a benzyl radical or the grouping

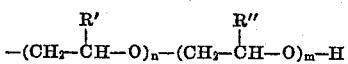

and X⁻ is an anion.

2. The process of claim 1 wherein said phenol is phenol, alkyl-phenol or halophenol and said amine is a monoalkylamine, a dialkylamine, a cycloalkylamine, an aralkylamine or an alkylene-diamine.

3. The process of claim 1 wherein said alkoxylation products of fatty amines are compounds of the formula

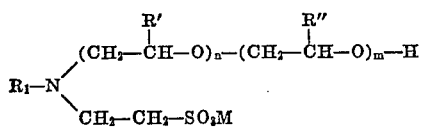

of their quaternization products of the formula

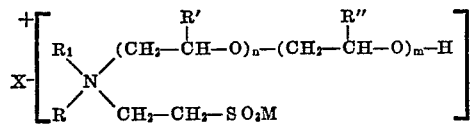

wherein $R_1$, $R'$, $R''$, $n$, $m$, M, R and X have the meaning stated in claim 1.

4. The process of claim 1 wherein said alkoxylation products of fatty amines are compounds of the formula

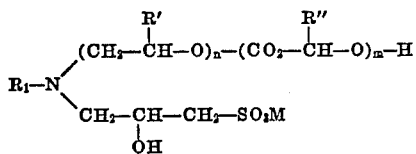

or their quaternization products of the formula

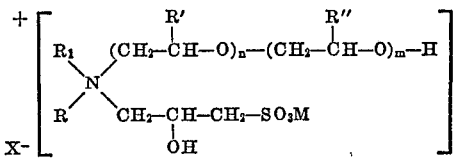

wherein $R_1$, $R'$, $R''$, $n$, $m$, M, R and X have the meaning given in claim 1.

References Cited

UNITED STATES PATENTS

| | | | |
|---|---|---|---|
| 1,970,578 | 10/1934 | Schoeller | 8—93 UX |
| 3,083,189 | 3/1963 | Reinhard | 8—62 |
| 3,203,801 | 8/1965 | Heiart | 96—115 P |
| 3,401,004 | 9/1968 | Krumme | 8—172 X |
| 3,125,402 | 3/1964 | Kruchenberg et al. | 8—79 X |
| 3,097,198 | 7/1963 | Fishwick et al. | 60—207.1 |

FOREIGN PATENTS

| | | | |
|---|---|---|---|
| 787,379 | 3/1953 | Great Britain | 8—39 |

OTHER REFERENCES

Merian, German Auslegeschrift 1,065,112, S49236IV b/22a, Sept. 10, 1959.

DONALD LEVY, Primary Examiner

U.S. Cl. X.R.

8—173; 260—207.1

UNITED STATES PATENT OFFICE
CERTIFICATE OF CORRECTION

Patent No. 3,682,584  Dated August 8, 1972

Inventor(s) Gunther Boehmke, Walter Hees, and Mathieu Quaedvlieg

It is certified that error appears in the above-identified patent and that said Letters Patent are hereby corrected as shown below:

| Column | Line | Error |
|---|---|---|
| 2 | 9 | "butyl" should read ---dibutyl--- |
| 3 | 65 | after "such" insert ---as ethyleneoxide or propylene oxide. The alkoxylation--- |
| 5 | 8 | "cycol" should read ---glycol--- |
| 5 | 20-21 | transposed |
| 5 | 27 | "tio," should read ---tion,--- |
| 5 | 33 | "100%" should read ---100°C--- |
| 5 | 72 | "30g" should read ---80g--- |
| 7 | Claim 1 67 | "(c)" should read ---(b)--- |
| 7 | Claim 1 in the formula | "$\left(\begin{array}{c}CH \\ | \\ R_3\end{array}\right)$" should read ---$\left(\begin{array}{c}CH \\ | \\ R_3\end{array}\right)_p$--- |

Signed and sealed this 19th day of November 1974.

(SEAL)
Attest:

McCOY M. GIBSON JR.
Attesting Officer

C. MARSHALL DANN
Commissioner of Patents